United States Patent [19]

Frey et al.

[11] 3,843,731
[45] Oct. 22, 1974

[54] PROCESS FOR PREPARING BUTANONE SELECTIVELY MONO- OR DICHLORO-SUBSTITUTED IN 3-POSITION

[75] Inventors: Volker Frey, Munich; Bernhard Kreiss, Germering, both of Germany

[73] Assignee: Consortium fur Elektrochemische Industrie GmbH, Munich, Germany

[22] Filed: May 31, 1972

[21] Appl. No.: 258,161

[30] Foreign Application Priority Data
June 21, 1971  Germany............................ 2130629

[52] U.S. Cl. ............................................ 260/593 H
[51] Int. Cl. ....................... C07c 45/00, C07c 49/16
[58] Field of Search ................................ 260/593 H

[56] References Cited
UNITED STATES PATENTS
2,116,893   5/1938   Heisel ............................ 260/593 H FOREIGN PATENTS OR APPLICATIONS
1,202,263   10/1965   Germany ...................... 260/593 H Primary Examiner—Bernard Helfin
Assistant Examiner—Norman P. Morgenstern
Attorney, Agent, or Firm—Allison C. Collard

[57] ABSTRACT

Process for preparing butanone selectively mono- or dichloro-substituted in 3-position by chlorination with HCl, oxygen, or oxygen-containing gases in the presence of copper chloride and water, wherein the reaction takes place below 150°C and the [$H^+$] — ion concentration in the aqueous reaction mixture is maintained during the entire reaction at a value between 0 and 0.5 mol per liter in the mono-chlorination of butanone (2), or at a value of between 0.5 and 4.5 mol per liter in the dichlorination of butanone (2).

5 Claims, No Drawings

PROCESS FOR PREPARING BUTANONE SELECTIVELY MONO- OR DICHLORO-SUBSTITUTED IN 3-POSITION

The present invention relates to a process for the selective preparation of 3-chloro-butanone (2), abbreviated Cl—MEK, or 3,3 dichlorobutanone (2), abbreviated $Cl_2$—MEK.

It is known that ketones and aldehydes can be converted continuously or discontinuously into chlorination products in the presence of aqueous copper chloride solutions with the formation of one mol copper (I) chloride and 1/2 mol hydrogen chloride from one mol copper (II) chloride (DAS 1202 263).

According to a process described in DAS 1138 755, n-butenes are converted into 3-chlorobutanone-(2) with an aqueous solution of copper chloride and palladium chloride at temperatures above 95°C, the oxidation potential being maintained with oxygen at a value above 330 millivolts (measured at 80°C with respect to a calomel normal electrode).

It was a significant shortcoming of the methods hitherto used in the chlorination of butanones with copper chloride, that, in addition to a number of chlorinated byproducts, the main product was in the form of a mixture of Cl—MEK and $Cl_2$—MEK, which, due to the similar boiling points of the two chlorination products (Cl—MEK=114° and $Cl_2$—MEK=112°–113°C), could not be separated by distillation.

It is the main object of the present invention to provide a process for the selective mono-or dichlorination of butanones (2) in 3 position which is free of the above shortcoming.

Accordingly, the present invention provides a process in which selective mono-or dichlorination of butanone is carried out by subjecting butanone to the reaction with hydrogen chloride, oxygen or oxygen-containing gases in the presence of copper chloride and water by maintaining the reaction temperature below 150°C and by ensuring that the $[H^+]$ — ion concentration in the aqueous reaction mixture remains, during the entire reaction, at a value between 0 and 0.5 mol/liter, if it is desired to obtain 3-chlorobutanone (2), and at a value between 0.5 and 4.5 if 3,3-dichloro-butanone (2) is the desired product. The preferred $[H^+]$ — ion concentration in the latter case is between 2.5 and 4.5 mol/liter.

The chlorinated butanones made according to the invention are highly reactive, and are, moreover, valuable starting products for a number of organic syntheses. Thus, from Cl—MEK, tetramethyl pyrazine, $\alpha$-chloropropionic acid, oxazole -and thiazole derivatives may be obtained; from $Cl_2$—MEK, dimethyl glyoxime, diacetyl or $\alpha,\alpha$-dichloropropionic acid may be obtained.

The chlorination is preferably carried out between 50° and 150°C, particularly between 50° and 120°C. The optimum temperature range for preparing Cl—MEK is 50°–90°C, and for preparing $Cl_2$MEK the range 60°–120°C is best. The chlorination may be carried out at normal or elevated pressure, preferably at pressures between 1 and 5 atmospheres.

The concentration of the copper chloride in the aqueous solution may vary within wide limits. In most cases, the concentration is between 0.5 and 5.0 mol/liter. It is preferred, however, to use a solution which will be just below the crystallization point at room temperature.

For preparing 3-chlorobutanone (2), it is advantageous to start the reaction with a copper chloride solution containing 10 – 50 mol percent, preferably 15 – 25 mol percent copper (I) chloride, calculated with respect to the total copper content.

More particularly, the process of the present invention is carried out by adjusting the $[H^+]$ — ion concentration of the aqueous copper chloride solution, and reacting the solution with butanone. At the same time, oxygen, or an oxygen-containing gas, e.g., air, is introduced into the reaction mixture, and aqueous hydrochloric acid or gaseous hydrogen chloride is added, depending on the consumption of chloride ions. By various means, for example, selection of the reaction temperature or control of the oxygen concentration in the gas space, danger of explosion in that space is eliminated.

To adjust the pH-value before starting the reaction, the required amount of hydrochloric acid or hydrogen chloride is introduced into the aqueous catalyst solution. For this purpose, other acids, for example, perchloro-acetic acid or phosphoric acid which are inert to the starting and finishing products, and which have the necessary acidity for the reaction, may be used.

Since inorganically linked chlorine is introduced into the butanone molecule in a stoichiometric reaction in the chlorination, selected amounts of hydrochloric acid or hydrogen chloride are added continuously to the reaction mixture so that the ranges for the $[H^+]$ — ion concentrations are maintained.

More particularly, to obtain Cl—MEK it is essential that two molecules of hydrogen chloride are added in each phase of the reaction for one molecule of oxygen, corresponding to the stoichiometric condition of the reaction.

For checking the reaction solution, it is not sufficient to observe the course of the potential, since this depends substantially on the ratio of the concentrations of copper II and copper I ions. As a control, volumetric testing of the reaction solution and measurements of the gas volumina absorbed by the solution, are available.

The determination of the $[H^+]$ — ion concentration of the aqueous copper chloride solution, which is adjusted by HCl or hydrochloric acid, is made by volumetric analysis of the copper and chloride amounts. During the chlorination, the process of the invention is preferably controlled and checked by registering, by means of a measuring device, the oxygen-containing gas introduced into the reaction mixture as well as the escaping gas current; hydrogen chloride or hydrochloric acid is then added according to the amount of oxygen absorbed by the solution.

The reaction products formed may be separated by syphoning off the organic phases, or the entire mix may be removed in vapor form together with water and subsequently condensed. It is also possible to utilize a combination of these methods.

When 3-chlorobutanone- (2) is prepared, the butanone is usually chlorinated to a conversion of 80 percent by weight only, and thereafter the Cl-MEK is separated from butanone — (2) which may be returned to the reaction.

In the preparation of 3,3-dichlorobutanone- (2), pure $Cl_2$—MEK is obtained without fractional distillation.

The reaction can be carried out discontinuously or continuously. In the preparation of 3-chloro-butanone- (2), it is advantageous to apply the entire butanone in one batch before it undergoes chlorination. The reactors needed to carry out the reaction in the liquid phase may be of different design, e.g., vessels, with stirrers, if desired, or columns, for passage of gas, spray columns, or flow tubes.

Whereas the known processes for the preparation of 3-chloro-butanone- (2) led to the formation of larger amounts of other chlorination products, the advantage of the conversion of the present invention is that, when maintaining the described conditions, both 3-chloro-butanone- (2) and 3,3dichlorobutanone- (2) can be made selectively, without any other chlorination products being formed in noticeable amounts.

In the following, the invention is more fully explained in a number of examples which are given by way of illustration, and are not intended as a definition of the limits and scope of the invention.

EXAMPLE 1

Into a stirring vessel having a capacity of 50 liters, 5.4 kgs of butanone are introduced at a temperature of 68°–73°C. The vessel is filled with 35 liters of a catalyst solution containing 2.63 mol copper II chloride, 0.38 mol copper I chloride and 0.1 mol hydrogen chloride per liter. Depending upon the amount of oxygen absorbed by the solution, the amount of hydrogen chloride is adjusted during every phase of the reaction so that the molar ratio of the reactants in the solution is $O_2$: HCl = 1 : 2. When about 80 percent of the theoretically required HCl-amount has been added (total amount 60 mol = 2.19 kgs HCl), about 75 percent of the organic phase is syphoned off and the remainder is distilled off as an azeotropic mixture.

By separation of the reaction mixture in a column arranged in series, 6.2 kg Cl—MEK are obtained, which is contaminated by 1.9 weight percent of $Cl_2$—MEK. 11kg of butanone are also recovered which are returned to the reaction.

EXAMPLE 2

Into a stirring vessel having a capacity of 50 liters, 7.2 kgs of butanone are introduced at a temperature of 68° – 73°C. The vessel is filled with 33 liters of a catalyst solution containing 2.51 mol copper II chloride, 0.50 mol copper I chloride and 0.4 mol hydrogen chloride per liter. The reaction is conducted in a manner similar to that of Example 1. Obtained are 8.4 kgs of Cl—MEK with 2.1 percent per weight of $Cl_2$—MEK, and 1.39 kgs butanone, which may be returned to the reaction.

EXAMPLE 3

In a reaction vessel having a 50 liter capacity, 40 liters of a catalyst solution containing 3.05 mol copper II chloride and 3.48 mol hydrogen chloride per liter are introduced, and 3.6 kgs butanone are reacted at 78° – 82°C. During the reaction, 3.65 kgs of hydrogen chloride and 1.65 kgs oxygen are added in the approximate molar ratio of 2.1. Of the organic phase, 85 percent are obtained by syphoning off, and the remainder obtained by azeotropic distillation. The yield in $Cl_2$—MEK is 98 percent.

What is claimed is:

1. Process for the preparation of 3-chlorobutanone(2) by chlorination of butanone(2) comprising treating butanone(2) with hydrogen chloride and a free-oxygen containing gas in the presence of from 10 to 50 mol per cent of copper(I) chloride calculated with respect to the total copper content, and water, there being present 2 mols of hydrogen chloride for each mol of oxygen, at a [$H^+$] ion concentration between 0 and 0.5 mol/liter, at a temperature between about 50° and about 90°C.

2. The process of claim 1 in which the pressure is between about 1 and about 5 atmospheres.

3. The process of claim 1 in which the concentration of copper(I) chloride is between 15 and 25 mol per cent calculated with respect to the total copper content.

4. Process for the preparation of 3,3-dichlorobutanone(2) by chlorination of butanone(2) comprising treating butanone (2) with hydrogen chloride and a free-oxygen containing gas in the presence of from 10 to 50 mol per cent of copper(I) chloride calculated with respect to the total copper content, and water, there being present 2 mols of hydrogen chloride for each mol of oxygen, at a [$H^+$] ion concentration between 0.5 and 4.5 mol/liter, at a temperature between about 60° and about 120°C.

5. The process of claim 4 in which the [$H^+$] ion concentration is between 2.5 and 4.5 mol/liter.

* * * * *